(12) United States Patent
Yannone

(10) Patent No.: US 7,654,185 B1
(45) Date of Patent: Feb. 2, 2010

(54) SYSTEM AND METHOD FOR DEFENDING AGAINST A PROJECTILE

(75) Inventor: Ronald Yannone, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 66 days.

(21) Appl. No.: 11/651,146

(22) Filed: Jan. 8, 2007

Related U.S. Application Data

(60) Provisional application No. 60/757,450, filed on Jan. 9, 2006.

(51) Int. Cl.
*F41H 11/00* (2006.01)

(52) U.S. Cl. .................................. 89/1.11; 89/36.17

(58) Field of Classification Search ............... 89/1.11, 89/36.17
See application file for complete search history.

(56) References Cited

U.S. PATENT DOCUMENTS

| | | | | |
|---|---|---|---|---|
| 6,155,155 A * | 12/2000 | Moshier | .................. | 89/1.13 |
| 6,279,449 B1 * | 8/2001 | Ladika et al. | .............. | 89/36.17 |
| 6,412,391 B1 * | 7/2002 | Stevens et al. | ............. | 89/36.17 |
| 6,595,102 B2 * | 7/2003 | Stevens et al. | ............. | 89/36.17 |
| 6,822,583 B2 * | 11/2004 | Yannone et al. | ............. | 340/945 |
| 6,995,660 B2 * | 2/2006 | Yannone et al. | ............. | 340/425.5 |
| 7,046,187 B2 * | 5/2006 | Fullerton et al. | ............... | 342/54 |
| 7,066,427 B2 * | 6/2006 | Chang | ........................ | 244/3.19 |
| 7,104,496 B2 * | 9/2006 | Chang | ........................ | 244/3.19 |
| 7,132,961 B2 * | 11/2006 | Yannone et al. | ............. | 340/961 |
| 2004/0027257 A1 * | 2/2004 | Yannone et al. | ............. | 340/945 |
| 2004/0061595 A1 * | 4/2004 | Yannone et al. | ............. | 340/425.5 |
| 2005/0110661 A1 * | 5/2005 | Yannone et al. | ............. | 340/945 |
| 2006/0283317 A1 * | 12/2006 | Melnychuk et al. | ........ | 89/41.03 |
| 2007/0180983 A1 * | 8/2007 | Farinella et al. | ............ | 89/36.07 |
| 2007/0244673 A1 * | 10/2007 | Khosla et al. | .................. | 703/2 |

* cited by examiner

*Primary Examiner*—Bret Hayes
*Assistant Examiner*—Michael D David
(74) *Attorney, Agent, or Firm*—Graybeal Jackson LLP; Daniel J. Long

(57) ABSTRACT

An embodiment of a protection system for an object includes first and second sensors and a processor coupled to the sensors. The sensors are mountable to a side of the object a predetermined distance apart, and each sensor is operable to detect a respective angle between the sensor and a location from which a projectile is fired toward the side. The processor is operable to determine from the detected angles whether the firing location is aligned with the object. If the firing location is aligned with the object, then the processor is operable to calculate from the detected angles and the predetermined distance a time window during which the processor estimates that the projectile will strike the object, and is operable to cause a protection unit to defend against the projectile for the duration of the time window. Such a protection system may be less expensive to acquire, install, or operate than prior protection systems, and may expand defenses more efficiently than prior protection systems.

19 Claims, 3 Drawing Sheets

SYSTEM AND METHOD FOR DEFENDING AGAINST A PROJECTILE

CLAIM OF PRIORITY

This application claims priority to U.S. Provisional Application Ser. No. 60/757,450 filed on Jan. 9, 2006, which is incorporated by reference.

BACKGROUND

Systems are available for protecting an object, such as a vehicle, or a group of objects, such as a convoy of vehicles, from a projectile fired at the object or group of objects. Examples of the projectile include a shell and a rocket-propelled grenade (RPG).

FIG. 1 is a plan view of a convoy 10 of vehicles $12_1$-$12_n$, such as tanks, and two RPG launchers $14_a$ and $14_b$ for firing RPGs (not shown in FIG. 1) at the vehicles.

Each vehicle $12_1$-$12_n$ includes a respective protection system $16_1$-$16_n$, which protects the vehicle (and perhaps nearby vehicles) from damage caused by fired RPGs, and which protects the passengers of the vehicle (and perhaps the passengers of nearby vehicles) from injuries caused by the fired RPGs. For example, one or more of the systems $16_1$-$16_n$ may launch countermeasures (not shown in FIG. 1) or other enable defenses in response to the launcher $14_a$ firing an RPG at the convoy 10. Such countermeasures/defenses may damage or destroy the fired RPG. Or, where the launcher $14_a$ fires a projectile that can change its direction after firing (e.g., a guided missile), such countermeasures/defenses may cause the projectile to veer away from the convoy 10.

Unfortunately, each protection system $16_1$-$16_n$ may be relatively expensive to acquire and install. For example, a protection system 16 that incorporates radar may cost hundreds of thousands of dollars to acquire and install on a vehicle such as a tank.

Furthermore, the protection systems 16 may be relatively inefficient and expensive to operate. For example, if the system $16_1$ in the convoy 10 detects the firing of an RPG (not shown in FIG. 1) from the launcher $14_a$, the system $16_1$ may launch countermeasures, and may also cause the other systems $16_2$-$16_n$ in the convoy to launch countermeasures, even though countermeasures launched by fewer than all of the systems 16 are sufficient to disable or destroy the fired RPG. The loss of the unnecessarily launched countermeasures may reduce the convoy's mission time and may compromise the systems' ability to defend the convoy 10 against subsequent attacks. Furthermore, the time and the cost of replacing the unnecessarily launched countermeasures may be significant.

SUMMARY

According to an embodiment of the invention, a protection system for an object includes first and second sensors and a processor coupled to the sensors. The sensors are mountable to a side of the object a predetermined distance apart, and each sensor is operable to detect a respective angle between the sensor and a location from which a projectile is fired toward the side. The processor is operable to determine from the detected angles whether the firing location is aligned with the object. If the firing location is aligned with the object, then the processor is operable to calculate from the detected angles and the predetermined distance a time window during which the processor estimates that the projectile will strike the object, and is operable to cause a protection unit to defend against the projectile for the duration of the time window.

Such a protection system may be less expensive to acquire, install, and operate than prior protection systems, and may expend defenses more efficiently than prior protection systems.

DETAILED DESCRIPTION

Figure 2:
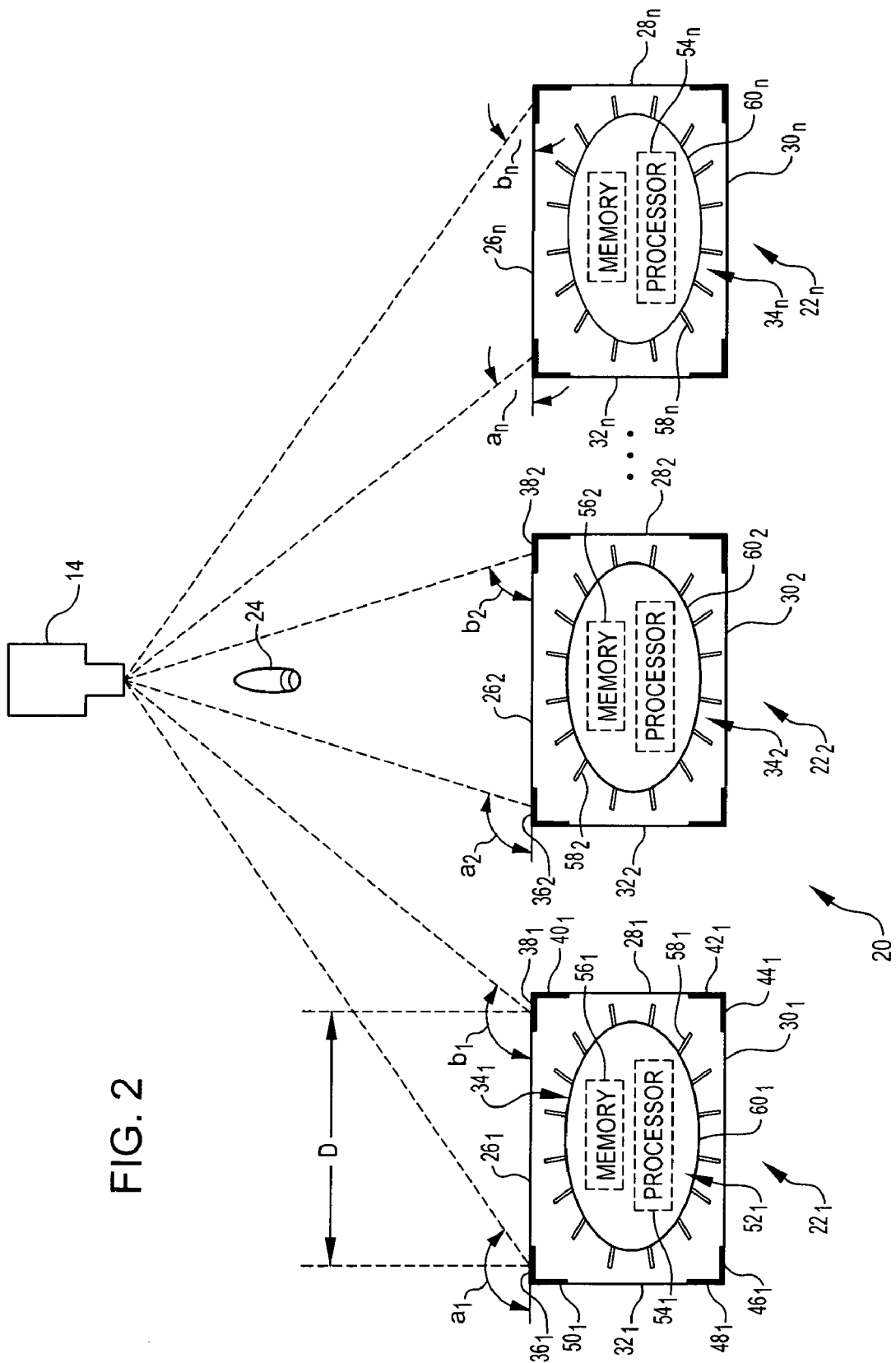
FIG. 2 is a plan view of a convoy of vehicles under fire from a projectile launcher, where each vehicle has respective protection system according to an embodiment of the invention.

FIG. 2 is a plan view of a convoy 20 of vehicles $22_1$-$22_n$, such as tanks, according to an embodiment of the invention, and of a launcher 14 for firing RPGs 24 (only one shown in FIG. 2) at the vehicles.

Each vehicle $22_1$-$22_n$ includes respective sides $26_1$-$26_n$, $28_1$-$28_n$, $30_1$-$30_n$, and $32_1$-$32_n$, and a respective protection system $34_1$-$34_n$, which may be more efficient and less expensive to acquire, install, or operate than prior protection systems.

Each protection system $34_1$-$34_n$ protects the respective vehicle $22_1$-$22_n$ on which it is installed (and perhaps nearby vehicles) from damage caused by the fired RPGs 24, and protects passengers (not shown in FIG. 2) of the vehicle (and perhaps the passengers of nearby vehicles) from injuries caused by the fired RPG, according to an embodiment of the invention. Because, as discussed below, each system 34 respectively includes relatively inexpensive multi-band infrared sensors $36_1$-$36_n$, $38_1$-$38_n$, $40_1$-$40_n$, $42_1$-$42_n$, $44_1$-$44_n$, $48_1$-$48_n$, and $50_1$-$50_n$, the system may be less expensive to acquire and install than prior systems. Furthermore, where a system $34_1$-$34_n$ launches defenses only when the vehicle $22_1$-$22_n$ on which the system is installed is aligned with the launcher 14, the system may be more efficient and less expensive to operate than prior systems. Moreover, launching defenses from only the side(s) of the vehicle 22 facing the launcher 14 may further increase the efficiency and reduce the operating expenses of the respective protection system 34.

Still referring to FIG. 2, each protection system $34_1$-$34_n$ includes eight respective multi-band infrared sensors $36_1$-$36_n$, $38_1$-$38_n$, $40_1$-$40_n$, $42_1$-$42_n$, $44_1$-$44_n$, $46_1$-$46_n$, $48_1$-$48_n$, and $50_1$-$50_n$, a respective protection unit $52_1$-$52_n$ for launching countermeasures (not shown in FIG. 2) or enabling other defenses, a respective processor $54_1$-$54_n$ coupled to the respective sensors and to the respective protection unit, and a respective memory $56_1$-$56_n$ coupled to the processor.

The multi-band infrared sensors 36, 38, 40, 42, 44, 46, 48, and 50 are each mounted to a respective vehicle side adjacent to an upper corner of the vehicle. For example, the sensors $36_1$ and $38_1$ of the system $34_1$ are respectively mounted to the upper corners of the side $26_1$ of the vehicle $22_1$, the sensors $40_1$ and $42_1$ are respectively mounted to the upper corners of the side $28_1$, the sensors $44_1$ and $46_1$ are respectively mounted to the upper corners of the side $30_1$, and the sensors $48_1$ and $50_1$ are respectively mounted to the upper corners of the side $32_1$. The sensors mounted to a same side of a vehicle are separated by a predetermined distance, which may be measured from the center of each sensor. For example, the centers of the sensors $36_1$ and $38_1$ are separated by a predetermined distance D. As described in more detail below, each sensor on a side of a vehicle 22 is operable to detect the firing of a projectile toward the vehicle from that side, and is operable to detect the elevation and the respective azimuth angle between the sensor and the location from which the projectile is fired. For example, the sensors $36_2$ and $38_2$ are operable to detect the firing of the RPG 24, the elevation angle z (FIG. 3), and the azimuth angles $a_2$ and $b_2$, respectively. The sensors $36_1$-$36_n$, $38_1$-$38_n$, $40_1$-$40_n$, $42_1$-$42_n$, $44_1$-$44_n$, $46_1$-$46_n$, $48_1$-$48_n$, and $50_1$-$50_n$, may be Warner sensors or any other type of suitable multi-band infrared sensor.

Each of the protection units $52_1$-$52_n$ includes one or more tubes $58_1$-$58_n$ for launching countermeasures or other defenses (neither shown in FIG. 2). Each set of tubes $58_1$-$58_n$ are positioned to form a respective perimeter $60_1$-$60_n$ around the entire respective vehicle $22_1$-$22_n$. Although the perimeters $60_1$-$60_n$ are shown as having an oval shape, the perimeters may have different shapes. Alternatively, each set of launch tubes $58_1$-$58_n$ may be positioned to form a perimeter along only a portion of the respective vehicle $22_1$-$22_n$. Furthermore, each protection unit $52_1$-$52_n$ may launch countermeasures from a selected one or more than one of the respective launch tubes $58_1$-$58_n$. In one embodiment, each protection unit $52_1$-$52_n$ includes two respective launch tubes 58, where the protection unit can maneuver each of the two launch tubes to cover a respective half of the perimeter 60. For example, in such embodiment the protection unit $52_1$ includes two launch tubes 58. The protection unit $52_1$ can maneuver one tube 58 to cover the vehicle $22_1$ from the side $26_1$ and from the halves of the sides $28_1$ and $32_1$ adjacent to the side $26_1$, and can maneuver the other tube 58 to cover the vehicle from the side $30_1$ and from the halves of the sides $28_1$ and $32_1$ adjacent to the side $30_1$. Because the protection units $52_1$-$52_n$ may be conventional, further details of these units are omitted for brevity.

Each of the processors $54_1$-$54_n$ receives signals from the respective sensors $36_1$-$36_n$, $38_1$-$38_n$, $40_1$-$40_n$, $42_1$-$42_n$, $44_1$-$44_n$, $46_1$-$46_n$, $48_1$-$48_n$, and $50_1$-$50_n$, and determines from these signals the side of the respective vehicle $22_1$-$22_n$ facing the launcher 14, and whether the respective vehicle is aligned with the launcher. If the respective vehicle $22_1$-$22_n$ is aligned with the launcher 14, then the respective processor $54_1$-$54_n$ estimates from these signals a time-to-go (TTG) window during which countermeasures or other defenses should be active to prevent the incoming RPG 24 from damaging one or more of the vehicles and from injuring passengers. Then, the respective processor $54_1$-$54_n$ causes the respective protection unit $52_1$-$52_n$ to launch the countermeasures or other defenses from the side of the respective vehicle $22_1$-$22_n$ facing the launcher 14 such that the countermeasures/defenses are active for the duration of the TTG window. Next, the respective processor $54_1$-$54_n$ may cause a weapon (not shown in FIG. 2) to target and destroy the launcher 14. The calculation of the TTG window is further described below in conjunction with FIG. 4, and the targeting of a weapon is further described below in conjunction with FIG. 6.

Each of the memories $56_1$-$56_n$ may store speed information, firing-signature (i.e., launch/burn) information, and other information about the RPG 24, and may also store computer instructions that are retrieved and executed by the processor 54. The speed and firing-signature (i.e., launch/burn) information are further described below in conjunction with FIGS. 4-5.

Figure 3:
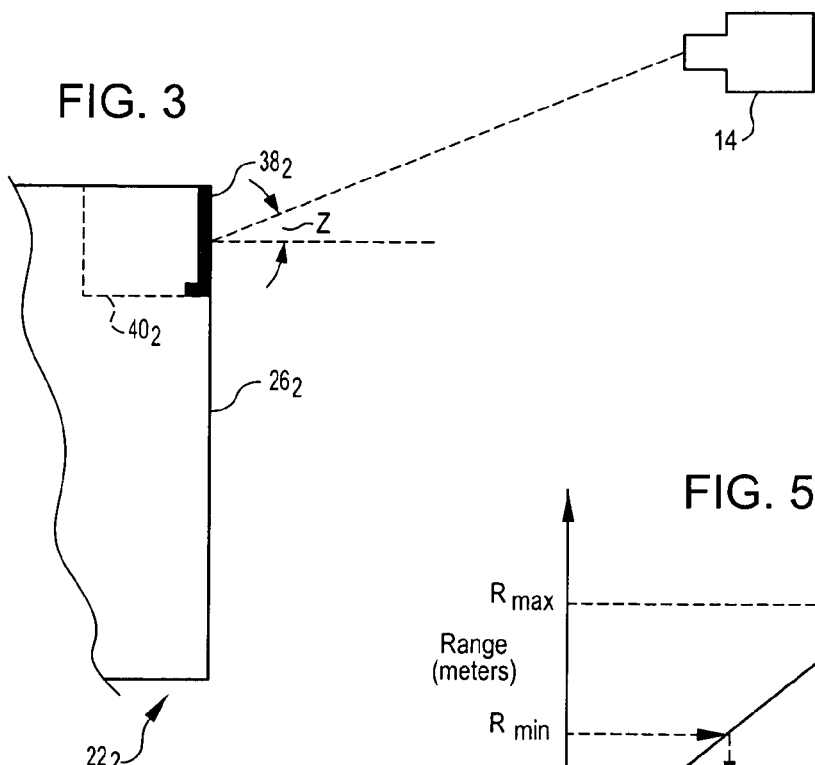
FIG. 3 is side view of the projectile launcher and an end view of one of the vehicles of FIG. 2 according to an embodiment of the invention.

FIG. 3 is a partial end view of the vehicle $22_2$ and a side view of the launcher 14 of FIG. 2 according to an embodiment of the invention, where the sensor $40_2$ is shown in dashed line so that the sensor $38_2$ is visible. In addition to detecting the azimuth angle $b_2$ (FIG. 2), the sensor $38_2$ also detects the elevation angle z between it and the launcher 14 in response to the launcher firing the RPG 24 (FIG. 2). Although not shown in FIG. 3, the sensor $36_2$ also detects the same elevation angle z, assuming that the vehicle $22_2$ is on substantially level ground.

Figure 4:
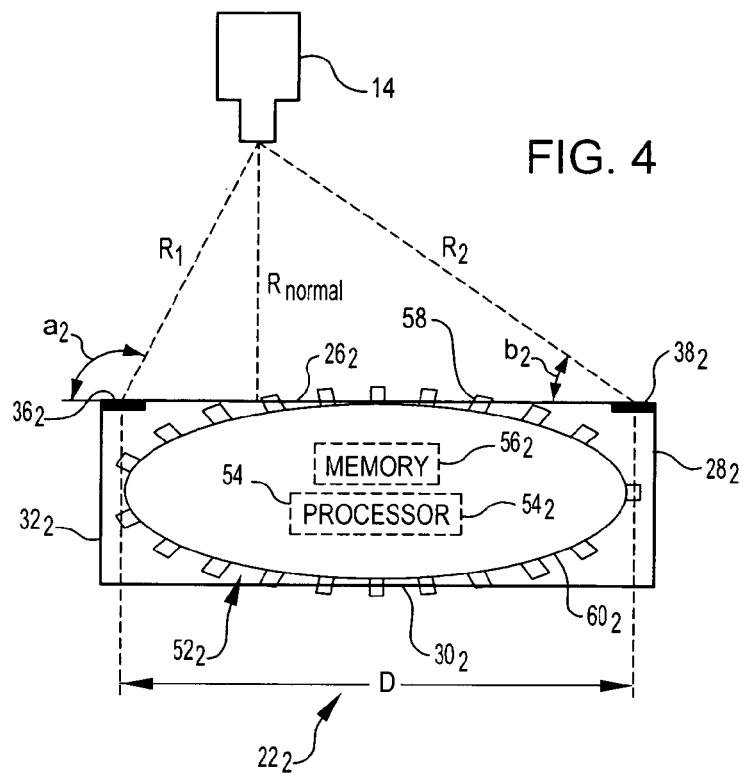
FIG. 4 is a plan view of the projectile launcher and the vehicle of FIG. 3 according to an embodiment of the invention.

FIG. 4 is a magnified plan view of the vehicle $22_2$ and the launcher 14 of FIGS. 2 and 3 according to an embodiment of the invention. The respective ranges (i.e., distances) $R_1$ and $R_2$ between the sensors $36_2$ and $38_2$ and the launcher 14 are shown in dashed line, as is the perpendicular range $R_{normal}$ between the vehicle $22_2$ and the launcher. For clarity, the sensors $40_2$, $42_2$, $44_2$, $46_2$, $48_2$, and $50_2$ are omitted from FIG. 4.

Referring to FIGS. 2-4, the operation of the protection systems $34_1$-$34_n$ are discussed according to an embodiment of the invention where the vehicle $22_2$ is aligned with the launcher 14 when the launcher fires the RPG 24. In this embodiment, it is assumed that the launcher 14 is aimed directly at the vehicle $22_2$, or is sufficiently aimed in the direction of the vehicle $22_2$ such that countermeasures or other defenses that the protection unit $52_2$ launches from the tubes $58_2$ can prevent the RPG 24.

First, the launcher 14 fires the RPG 24 at the vehicle $22_2$. The exploding charge (e.g., gun powder) that propels the RPG 24 out of the barrel of the launcher 14 generates heat having characteristics unique to the launcher; collectively, these characteristics compose the firing signature (i.e., the launch/burn, sometimes called the heat signature) of the fired RPG. Because the firing signature (i.e., launch/burn) appears at the opening of the launcher barrel, the location of the firing signature (i.e., launch/burn) is substantially the same as the location of the launcher 14 for purposes of this discussion. Furthermore, because such firing signatures (i.e., launch/burn) are known, a detailed discussion of the RPG 24 firing signature (i.e., launch/burn) is omitted for brevity.

Next, referring to FIGS. 2-3, the sensors $36_1$ and $38_1$, $36_2$ and $38_2$, ..., and $36_n$ and $38_n$ each detect the signature (i.e., launch/burn), the respective azimuth angle $a_1$-$a_n$ and $b_1$-$b_n$, and the elevation angle z. Specifically, these sensors each generate a respective electronic signal that represents the firing signature (i.e., launch/burn), the respective azimuth angle $a_1$-$a_n$ or $b_1$-$b_n$, and the elevation angle z. Although some of the other sensors $40_1$-$40_n$, $42_1$-$42_n$, $44_1$-$44_n$, $46_1$-$46_n$, $48_1$-$48_n$, and $50_1$-$50_n$, may also detect the firing signature (i.e., launch/burn), the corresponding signals that these other sensors generate are significantly weaker than the signals that the sensors $36_1$ and $38_1$, $36_2$ and $38_2$, ..., and $36_n$ and $38_n$ generate, because the other sensors are disposed on the sides $28_1$-$28_n$, $30_1$-$30_n$, $32_1$-$32_n$ of the vehicles $22_1$-$22_n$ not facing the launcher 14.

Then, each processor $54_1$-$54_n$ determines from the respective azimuth angles $a_1$-$a_n$ and $b_1$-$b_n$ whether the vehicle 22 on which the processor is installed is aligned with, and thus in the line of fire of, the launcher 14. If both respective angles a and b are obtuse or acute, then the respective processor 54 determines that the vehicle 22 is not in the line of fire of the launcher 14. In contrast, if one of the respective angles a and b is obtuse, and the other angle is acute, then the processor 54 determines that the vehicle 22 is in the line of fire of the launcher 14. For example, because the azimuth angles $a_1$ and $b_1$ are both obtuse angles, the processor $54_1$ determines that the vehicle $22_1$ is not aligned with the launcher 14, i.e., the processor $54_1$ determine that the vehicle $22_1$ has "you are not the one (YANTO)" status. Or, put another way, the processor $54_1$ determines that the launcher 14 is not located between the sensors $36_1$ and $38_1$ in the azimuth dimension. Similarly, because the azimuth angles $a_n$ and $b_n$ are both acute angles, the processor $54_n$ determines that the vehicle $22_n$ is not aligned with the launcher 14, and thus has YANTO status. In contrast, because the azimuth angle $a_2$ is obtuse and the azimuth angle $b_2$ is acute, the processor $54_2$ determines that the vehicle $22_2$ is aligned with the launcher 14, and thus has "you are the one (YATO)" status.

Next, the processors $54_1$ and $54_3$-$54_n$ on the vehicles $22_1$ and $22_3$-$22_n$, which are not aligned with the launcher 14 (i.e., the processors on the vehicles having YANTO status), take no further action.

But referring to FIG. 4, the processor $54_2$ on the vehicle $22_2$, which is aligned with the launcher 14 (i.e., the processor on the vehicle having YATO status), computes a TTG window within which the protection unit $52_2$ will launch and maintain countermeasures or other enable defenses against the RPG 24.

To compute the TTG window, the processor $54_2$ uses well-known trigonometric relationships to first calculate the range $R_{normal}$ between the launcher 14 and the vehicle $22_2$ in the azimuth plane. Using the law of sines and the known quantities D, $a_2$, and $b_2$, the processor $54_2$ calculates $R_1$, $R_2$, or both $R_1$ and $R_2$ (which lie in the azimuth plane) according to the following equations:

$$R_1 = D\sin(b_2)/\sin(a_2-b_2) \quad (1)$$

$$R_2 = D\sin(\pi-a_2)/\sin(a_2-b_2) \quad (2)$$

Where $R_1 \gg D$ and $R_2 \gg D$ (for example $R_1$ and $R_2$ are at least ten times greater than D), then $R_1 \approx R_2 \approx R_{normal}$. Because this is typically the case, the processor $54_2$ can use the value calculated for $R_1$ or $R_2$ as an approximation of $R_{normal}$. Alternatively, the processor $54_2$ can calculate $R_{normal}$ according to one of the following equations:

$$R_{normal} = R_2 \sin(b_2) \quad (3)$$

$$R_{normal} = R_1 \sin(\pi-a_2) \quad (4)$$

Next, the processor $54_2$ calculates a percentage range error (PRE) according to the following equation:

$$PRE = \frac{100 * \sigma_{AZ1}\sqrt{\left(\left(\cos(\pi-a_2)-\frac{D}{R_1}\right)^2 + \sin^2(\pi-a_2)\right)^2 + \left(1-\frac{D}{R_1}\cos(\pi-a_2)\right)^2}}{\frac{D}{R_1}\sin(\pi-a_2)} \quad (5)$$

where $\sigma_{AZ1}$ is the magnitude in radians of the maximum expected error in $a_2$. For example, in an embodiment where the sensor $36_2$ is a Warner sensor, $\sigma_{AZ1}$ may equal 0.2 radians. Alternatively, one may modify equation (5) by replacing $\pi-a_2$ with $b_2$ and replacing $R_1$ with $R_2$.

Then, the processor $54_2$ identifies the type of the projectile (here the RPG 24) by determining that the projectile is an RPG, and retrieves the average velocity $V_{avg}$ of the RPG from the memory $56_2$. As discussed above, the sensors $36_2$ and $38_2$ generate a signal that includes information about the firing signature (i.e., launch/burn) of the RPG 24. The processor $54_2$ extracts this information from the signal, and compares this information to firing-signature information stored in the memory $56_2$. That is, the processor $54_2$ effectively compares the firing signature of the RPG 24 with firing signatures stored in the memory $56_2$. The processor $54_2$ then retrieves from the memory $56_2$ the average velocity associated with the stored firing signature that best matches the extracted firing signature of the RPG 24. Because procedures are known for determining which stored firing signature best matches the firing signature of the RPG 24, a further description of such a procedure is omitted for clarity.

Next, the processor $54_2$ estimates bounds $TTG_{sooner}$ and $TTG_{later}$ of the TTG window according to the following equations:

$$TTG_{sooner} = (R_{normal} - PRE \cdot R_{normal})/V_{avg} \quad (6)$$

$$TTG_{later} = (R_{normal} + PRE \cdot R_{normal})/V_{avg} \quad (7)$$

For example, if $R_{normal} = 1000$ meters, PRE=0.1=10%, and $V_{avg} = 500$ meters/second, then $TTG_{sooner} = 1.8$ seconds, and $TTG_{later} = 2.2$ seconds. This means that the processor $54_2$ estimates that the RPG 24 will be vulnerable to countermeasures or other defenses from the protection unit $52_2$ between 1.8 seconds and 2.2 seconds after the launcher 14 fires the RPG 24.

Alternatively, to provide a greater confidence that the RPG 24 will be vulnerable to the countermeasures/defenses from the protection unit $52_2$ at some point within the TTG window, the processor $54_2$ may instead estimate bounds $TTG_{sooner}$ and $TTG_{later}$ of the TTG window according to the following equations:

$$TTG_{sooner} = (R_{normal} - 2PRE \cdot R_{normal})/V_{avg} \quad (8)$$

$$TTG_{later} = (R_{normal} + 2PRE \cdot R_{normal})/V_{avg} \quad (9)$$

Equations (8) and (9) increase the size of the TTG window as compared to equations (6) and (7), and thus further increase the chances that the RPG 24 will be vulnerable to the countermeasures/defenses from the protection unit $52_2$ at some point within the TTG window.

Figure 5:
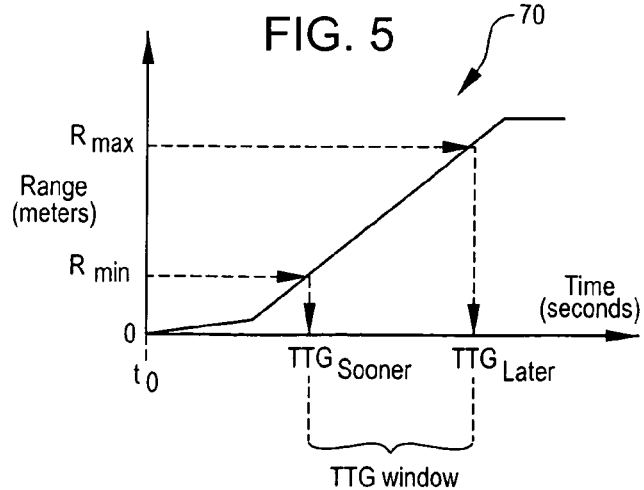
FIG. 5 is a plot of distance versus time for a projectile fired from the projectile launcher of FIGS. 2-4 according to an embodiment of the invention.

Referring to FIGS. 4 and 5, in yet another alternative, the processor $54_2$ estimates the bounds $TTG_{sooner}$ and $TTG_{later}$ of the TTG window from a stored distance-versus-time plot of the fired projectile (here the RPG 24) according to an embodiment of the invention.

FIG. 5 is a plot 70 of the distance that the RPG 24 travels from the launcher 14 (FIG. 4) versus time according to an embodiment of the invention, where $t_0$ is the time at which the launcher fires the RPG. The plot 70 may be previously generated based on data gathered over a number of fired RPGs, and may be stored in the memory $56_2$.

Referring to FIGS. 4-5, the processor $54_2$ first estimates the minimum and maximum ranges $R_{min}$ and $R_{max}$ of the firing location (i.e., the barrel opening of the launcher 14) of the RPG 24 according to the following equations:

$$R_{min} = R_{normal} - PRE \cdot R_{normal} \quad (10)$$

$$R_{max} = R_{normal} + PRE \cdot R_{normal} \quad (11)$$

Alternatively, to increase the chances that the actual range of the RPG firing location is between $R_{min}$ and $R_{max}$, the processor $56_2$ may instead estimate $R_{min}$ and $R_{max}$ according to the following equations:

$$R_{min}=R_{normal}-2PRE \cdot R_{normal} \quad (12)$$

$$R_{max}=R_{normal}+2PRE \cdot R_{normal} \quad (13)$$

Next, referring to FIG. 5, the processor $54_2$ identifies the type of the projectile, (here the RPG 24) as described above, and retrieves from the memory $56_2$ $TTG_{sooner}$, which corresponds to the minimum range $R_{min}$, and $TTG_{later}$, which corresponds to $R_{max}$.

Referring again to FIG. 4, after the processor $54_2$ calculates $TTG_{sooner}$ and $TTG_{later}$, the processor causes the protection unit $52_2$ to enable countermeasures/defenses against the RPG 24 for the duration of the TTG window=$TTG_{later}-TTG_{sooner}$. For example, if $TTG_{sooner}=1.8$ seconds and $TTG_{later}=2.2$ seconds, then the processor causes the protection unit $52_2$ to enable countermeasures/defenses against the RPG 24 at least between 1.8 and 2.2 seconds after the launch of the RPG 24. In one embodiment, the protection unit $52_2$ enables countermeasures/defenses by launching a single countermeasure device, such as a countermeasure NET device, from the tubes $58_2$ along the vehicle side $26_2$ such that the countermeasure device persists, i.e., is active or "up", for at least the duration of the TTG window. For example, if $TTG_{sooner}=1.8$ seconds and $TTG_{later}=2.2$ seconds and the countermeasure device has a persistence of 1.0 seconds, then the protection unit $52_2$ need only launch one countermeasure device to cover the 0.4 second (2.2 seconds-1.8 seconds) TTG window. But if the countermeasure device has a persistence of only 0.2 seconds, then the protection unit $52_2$ launches at least two countermeasure devices to cover the 0.4 second TTG window. Moreover, the processor $54_2$ may cause the protection unit $52_2$ to aim one or more of the tubes $58_2$ according to the azimuth angles $a_2$ and $b_2$ and the elevation angle z (FIG. 3).

Referring to FIGS. 2-5, if the launcher 14 fires a salvo of RPGs 24 (i.e., multiple RPGs in quick succession) at the vehicle $22_2$, then in one embodiment the processor $54_2$ calculates a composite TTG window that encompasses all of the fired RPGs. For example, suppose that the launcher 14 fires two RPGs 24 0.5 seconds apart, there is negligible movement of the vehicle $22_2$ within this 0.5 seconds, and the respective TTG window for each of the RPGs is between 1.8 seconds and 2.2 seconds after the respective launch time. So relative to the launch time of the first RPG 24, the TTG for the first RPG is between 1.8 and 2.2 seconds, and the TTG for the second RPG is between 1.8+0.5=2.3 seconds and 2.2+0.5=2.7. Therefore, the processor $54_2$ calculates the composite TTG window to be between 1.8 and 2.7 seconds. That is, the processor $54_2$ calculates the $TTG_{soonercomposite}$ of the composite TTG window to be the earliest $TTG_{sooner}$ of all the TTG windows for the fired RPGs, and calculates the $TTG_{latercomposite}$ of the composite TTG window to be the latest $TTG_{later}$ of all the TTG windows for the fired RPGs. For a continuous salvo having a duration that exceeds the maximum persistence of a launched countermeasure device, the processor $54_2$ may calculate multiple composite TTG windows each having a duration that is no longer than the maximum persistence of a countermeasure device.

Figure 1:
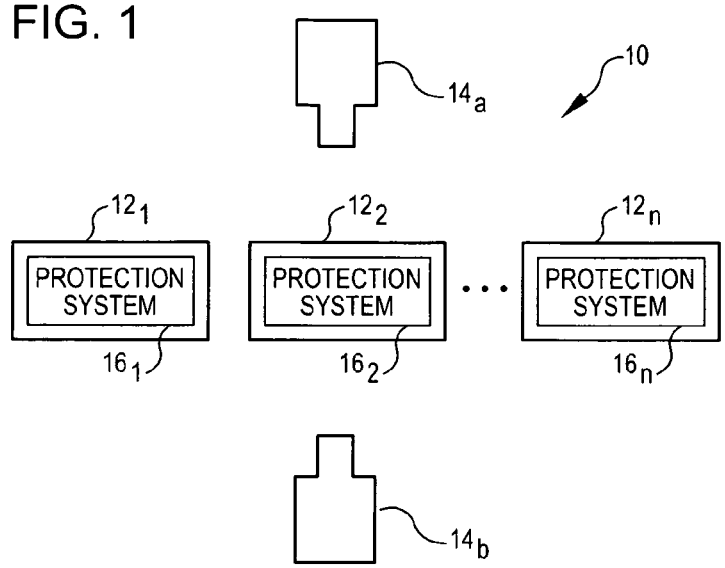
FIG. 1 is a plan view of a convoy of vehicles and projectile launchers aimed at the convoy, where each vehicle has a respective conventional protection system.

If multiple launchers (such as the launchers $14_a$ and $14_b$ of FIG. 1) each fire an RPG 24 at the vehicle $22_2$ from respective sides of the vehicle, then the processor $54_2$ may calculate a respective TTG window and launch a respective countermeasure for each fired RPG. If one or more of the launchers fire a salvo of RPGs, then the processor $54_2$ may calculate a respective composite TTG window for each respective salvo.

If, however, multiple launchers 14 each fire one or more RPGs 24 at the vehicle $22_2$ from the same side of the vehicle (or from a similar angle relative to the vehicle), then the processor $54_2$ may calculate a single composite TTG window that encompasses all of the fired RPGs (regardless of the launcher from which each RPG is fired), and launch a single countermeasure device that is "up" during the composite TTG window.

Still referring to FIGS. 2-5, other embodiments of the above-described projectile-defense techniques are contemplated. For example, the vehicles $22_1$-$22_n$ may be other than tanks (e.g., helicopters, planes, ships, submarines), and the convoy 20 may have as few as one vehicle. Furthermore, the processor $54_2$ on the YATO vehicle $22_2$ may cause protection units 52 on one or more YANTO vehicles 22 (e.g., the YANTO vehicle(s) $22_1$ and $22_3$ next to the YATO vehicle $22_2$) to enable countermeasures/defenses against the RPG 24 or other incoming projectile. In addition, if the incoming projectile is self powered (e.g., a missile that burns fuel), then the processor $54_2$ may repeat the above-described ranging technique to track the path of the projectile and update the TTG window for increased accuracy. Moreover, if the vehicle $22_2$ may not have YATO status by the time the RPG 24 reaches the convoy 20, then the processor $54_2$ may estimate which vehicle 22 will have YATO status at this time, and cause the protection unit 52 on that vehicle to enable countermeasures/defenses against the RPG. Furthermore, although the vehicle $22_2$ is the YATO vehicle in the above description, each of the protection systems $34_1$ and $34_3$-$34_n$ operate in a similar manner if the vehicle on which they are installed is the YATO vehicle. In addition, techniques that are a combination or subcombination of any of the above-described techniques are contemplated.

Figure 6:
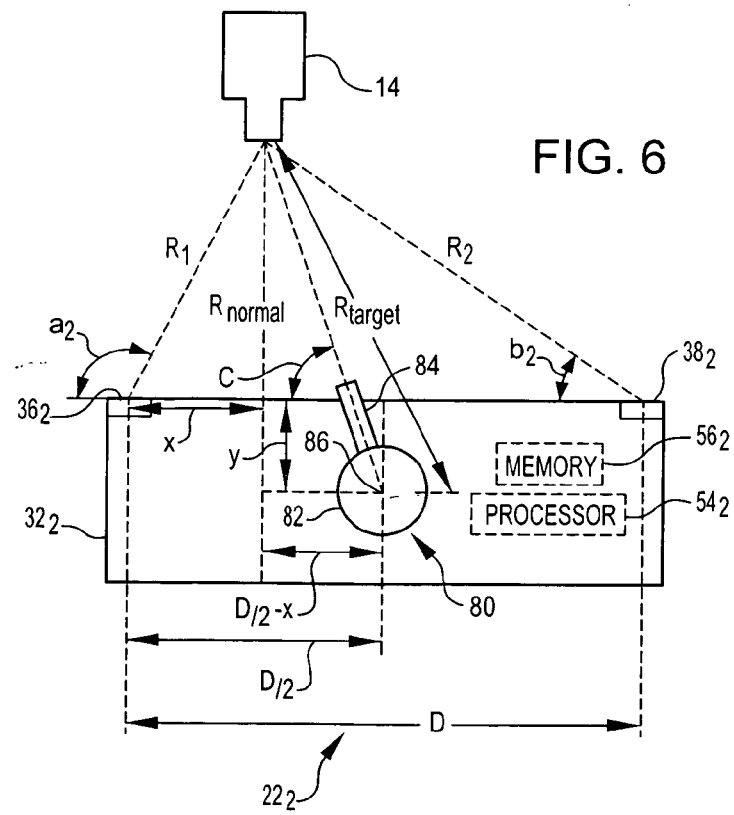
FIG. 6 is a plan view of the projectile launcher and the vehicle of FIG. 4, where the vehicle includes a weapon for targeting the projectile launcher according to an embodiment of the invention.

FIG. 6 is a plan view of the vehicle $22_2$ and launcher 14 of FIGS. 2-4 according to another embodiment of the invention, where the vehicle $22_2$ includes a gun or other weapon 80 that the processor $54_2$ may use to disable or destroy the launcher.

The gun 80 includes a turret 82 and a barrel 84 attached to the turret. The turret 82 is rotatable about a point 86, which in this embodiment is located at the top center of the vehicle $22_2$. The barrel 84 may be moveable up and down in the elevation dimension, and the gun 80 may fire a projectile such as a shell (not shown in FIG. 6) from the barrel 84.

To aim the barrel 84 of the gun 80 at a target such as the launcher 14, the processor $54_2$ first calculates the azimuth firing angle c and the range $R_{target}$ between the gun and the launcher according to the following equations, where y is known and $R_{normal}$ is calculated per equation (3) or (4):

$$x=R_1 \cos(\pi-a_2) \quad (14)$$

$$R_{target}=\sqrt{(R_{normal}+y)^2+(D/2-x)^2} \quad (15)$$

$$c=\arcsin(R_{normal}/R_{target}) \quad (16)$$

Next, the processor $54_2$ causes the turret 82 to rotate until the barrel 84 is at the azimuth firing angle c, and may cause the barrel 84 to move up or down in response to the elevation angle z (FIG. 3).

Then, the processor $54_2$ causes the gun 80 to fire a projectile (not shown in FIG. 6) such as a shell out of the barrel 84.

Next, the processor $54_2$ may use a conventional technique to determine whether the fined projectile (not shown in FIG. 6) disabled or destroyed the launcher 14.

If the processor $54_2$ determines that the launcher 14 is disabled or destroyed, then the processor may cease firing of the gun 80 at the launcher.

If, however, the processor $54_2$ determines that the launcher 14 is not disabled or destroyed, then the processor may repeat the above targeting-and-firing procedure until the launcher is disabled or destroyed. If the vehicle $22_2$ is moving, then the processor $54_2$ may update the range $R_{target}$ and azimuth firing angle c (which change as the vehicle moves) from new values of $a_2$ and $b_2$ provided by the sensors $36_2$ and $38_2$. But if the launcher 14 does not fire any more RPGs or other projectiles, then the processor $54_2$ may track the movement of the vehicle $22_2$ in a convention manner, and update $R_{target}$ and the angle c in response to this movement. Furthermore, the processor $54_2$ may pass the range ($R_{target}$) and firing angle (c) information to another vehicle 22 in the convoy 20 (FIG. 2) that is closer to the launcher 14 or that is otherwise in a better firing position.

Still referring to FIG. 6, alternate embodiments of the vehicle $22_2$ and the above-described weapons-targeting technique are contemplated. For example, the alternate embodiments discussed above for the vehicle $22_2$ in conjunction with FIGS. 2-5 are contemplated. Furthermore, the vehicle $22_2$ may include multiple guns 80. In addition, one or more of the other vehicles $22_1$ and $22_3$-$22_n$ may include one or more guns 80 that operate as described above.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A protection system for an object, the system comprising:
    first and second sensors for mounting to a side of the object a predetermined distance apart, each sensor adapted to detect a respective angle between the sensor and a location from which a projectile is fired toward the side; and
    a processor coupled to the sensors and programmed
        to determine from the detected angles whether the firing location is aligned with the object, and
        if the firing location is aligned with the object, then
            to calculate from the detected angles and the predetermined distance a first time and a second time that is later than the first time, the first and second times defining a time window within which the processor estimates that the projectile will strike the object, and
            to cause a protection unit to enable a defense against the projectile for the duration of the time window.

2. The system of claim 1 wherein each of the sensors comprises a respective multi-band infrared sensor.

3. The system of claim 1 wherein each of the sensors comprises a respective warner sensor.

4. The system of claim 1 wherein:
    each of the first and second sensors has a respective substantially planar surface facing away from the object side; and
    the respective angle is measured from the surface of the sensor.

5. The system of claim 1 wherein the protection unit is adapted to enable the defense by launching at least one countermeasure.

6. The system of claim 1 wherein the processor is adapted to determine that the firing location is aligned with the object if the firing location is between the first and second sensors.

7. The system of claim 1 wherein the processor is adapted to calculate the first and second times by:
    calculating a range of the firing location from the detected angles and the predetermined distance;
    calculating a range error factor from one of the angles, the range, the predetermined distance, and an error factor for the one of the angles;
    calculating the first and second times from the range, the range error factor, and a predetermined speed profile of the projectile.

8. The system of claim 1 wherein the processor is adapted to calculate the first and second times by:
    calculating a range of the firing location from the detected angles and the predetermined distance;
    calculating a range error factor from one of the angles, the range, the predetermined distance, and an error factor for the one of the angles;
    calculating the first and second times from the range, the range error factor, and a predetermined average speed of the projectile.

9. The system of claim 1 wherein:
    at least one of the sensors is operable to detect a firing signature of the fired projectile; and
    the processor is operable to identify the fired projectile from the firing signature.

10. The system of claim 1, further comprising a memory that is coupled to the processor and adapted to store a firing signature and a speed profile of the projectile.

11. The system of claim 1, further comprising a memory that is coupled to the processor and adapted to store a firing signature and an average speed of the projectile.

12. A vehicle, comprising:
    a side;
    first and second sensors disposed on the side and separated by a predetermined distance, each sensor configured to detect a respective angle between the sensor and a location from which a projectile is fired toward the side;
    a vehicle-protection unit configured to enable a defense against the projectile; and
    a processor coupled to the sensors and to the protection unit, the processor programmed to:
        determine from the detected angles whether the firing location is aligned with the vehicle, and
        if the firing location is aligned with the vehicle, then
            calculate from the detected angles and the predetermined distance a first time and a second time that is substantially later than the first time, the first and second times defining there between a time window within which the processor estimates that the projectile will strike the vehicle, and
            cause the protection unit to enable the defense for the duration of the time window.

13. The system of claim 1, further comprising the protection unit mountable to the object and coupled to the processor.

14. The system of claim 12, further comprising:
    a weapon disposed on the vehicle at a predetermined position between the sensors and operable to target the location from which the projectile is fired; and
    wherein the processor is adapted to target the weapon at the location in response to the detected angles, the predetermined distance, and the predetermined position.

15. A system, comprising:
    first and second sensors for mounting to a side of an object a predetermined distance apart, each sensor adapted to detect a respective angle between the sensor and a location from which a projectile is fired toward the side; and
    a processor coupled to the sensors and programmed to determine from the detected angles whether the firing location is aligned with the object, and if the firing location is aligned with the object, then to calculate from the detected angles and the predetermined distance a first time and a second time that is later than the first time, the first and second times defining a time window within which the processor estimates that the projectile will strike the object, and to cause a protection unit to enable a defense against the projectile for the duration of the time window.

16. The system of claim 15 wherein the processor is further adapted to determine that the firing location is between the first and second sensors when one of said respective detected angles is acute and the other of said detected angles is obtuse when the detected angles are measured in a same direction.

17. The system of claim 15 wherein the processor is further adapted to determine that the firing location is not between the first and second sensors when both of said detected angles are acute when measured in a same direction.

18. The system of claim 15 wherein the processor is further adapted to determine that the firing location is not between the first and second sensors when both of said respective detected angles are obtuse when measured in a same direction.

19. A vehicle, comprising:

a side;

first and second sensors disposed on the side and separated by a predetermined distance, each sensor configured to detect a respective angle between the sensor and a location from which a projectile is fired toward the side;

a vehicle-protection unit configured to enable a defense against the projectile; and a processor coupled to the sensors and to the protection unit, the processor programmed:

to determine from the detected angles whether the firing location is between the first and second sensors, and if the firing location is between the first and second sensors, then to calculate from the detected angles and the predetermined distance a time window within which the processor estimates that the projectile will strike the vehicle, and to cause the protection unit to enable the defense for the duration of the time window.

\* \* \* \* \*